(12) United States Patent
Stern et al.

(10) Patent No.: US 6,731,927 B1
(45) Date of Patent: May 4, 2004

(54) SYSTEM AND METHOD FOR CONTEXT ASSOCIATION

(75) Inventors: Robert Allen Stern, Los Altos, CA (US); Rod Drury, Wellington (NZ); Sunny Ahn, Cambridge, MA (US)

(73) Assignee: Context Connect, Inc., Boxford, MA (US)

(*) Notice: Subject to any disclaimer, the term of this patent is extended or adjusted under 35 U.S.C. 154(b) by 406 days.

(21) Appl. No.: 09/668,591

(22) Filed: Sep. 22, 2000

Related U.S. Application Data (60) Provisional application No. 60/218,469, filed on Jul. 14, 2000.

(51) Int. Cl.⁷ ................................................. H04M 3/42
(52) U.S. Cl. ...................... 455/414.1; 455/411; 707/9; 379/218.01
(58) Field of Search ............................. 707/3, 6, 9, 10; 455/411, 414, 426, 432; 379/114.01, 114.06, 203.01, 207.11, 218.01, 222, 223, 266.1

(56) References Cited

U.S. PATENT DOCUMENTS

| | | | |
|---|---|---|---|
| 4,734,931 A | 3/1988 | Bourg et al. ............... 379/93 |
| 4,879,747 A | 11/1989 | Leighton et al. ........... 380/23 |
| 5,204,894 A | 4/1993 | Darden ....................... 379/88 |
| 5,239,577 A | * 8/1993 | Bates et al. ............ 379/211.02 |
| 5,339,352 A | * 8/1994 | Armstrong et al. ......... 455/414 |
| 5,349,638 A | 9/1994 | Pitroda et al. ............. 379/142 |
| 5,371,781 A | 12/1994 | Ardon ........................ 455/445 |
| 5,404,506 A | 4/1995 | Fujisawa et al. ............. 707/4 |
| 5,425,102 A | * 6/1995 | Moy ......................... 713/183 |
| 5,442,703 A | 8/1995 | Kim et al. ................... 380/21 |
| 5,454,032 A | 9/1995 | Pinard et al. .............. 379/167 |
| 5,467,388 A | * 11/1995 | Redd et al. ............. 379/210.02 |
| 5,483,586 A | 1/1996 | Sussman ..................... 379/201 |
| 5,509,049 A | 4/1996 | Peterson ...................... 379/58 |
| 5,509,058 A | 4/1996 | Sestak et al. .............. 379/201 |
| 5,511,111 A | 4/1996 | Serbetcioglu et al. ......... 379/67 |
| 5,534,235 A | 7/1996 | Reed et al. ............ 395/200.31 |

(List continued on next page.)

FOREIGN PATENT DOCUMENTS

| | | |
|---|---|---|
| EP | 238257 B1 | 11/1987 |
| EP | 334626 A2 | 3/1989 |
| EP | 372692 B1 | 5/1989 |
| EP | 599558 A2 | 11/1993 |
| EP | 647075 A2 | 9/1994 |
| EP | 689316 A2 | 6/1995 |
| EP | 782315 A2 | 12/1996 |
| EP | 817101 A2 | 7/1997 |
| EP | 823809 A2 | 7/1997 |
| JP | 61141242 A | 6/1986 |
| JP | 63260343 A | 10/1988 |
| JP | 5176042 | 7/1993 |
| JP | 9294158 A | 11/1997 |
| JP | 10308733 A | 11/1998 |
| WO | WO 02/11396 | 2/2002 |

OTHER PUBLICATIONS

*The Transformation of the Public Network*; Telephony; Mar. 20, 1995, vol. 228; No. 12; p. 88; ISSN:0040–2656.

*Phone Numbers on the Move*; Telephony; Nov. 13, 1995; vol. 229, No. 20; p. 46; ISSN: 0040–2656.

*The Network with Smarts*; Byte; Oct. 1994, vol. 19; No. 10; p. 51.

Primary Examiner—William Trost
Assistant Examiner—James D Ewart
(74) Attorney, Agent, or Firm—Woodcock Washburn LLP (57) ABSTRACT

The present invention relates generally to an information system, and more particularly to a system and method for providing access to an entity by context association.

63 Claims, 3 Drawing Sheets

U.S. PATENT DOCUMENTS

| | | | |
|---|---|---|---|
| 5,668,955 A | 9/1997 | deCiutiis et al. | 379/130 |
| 5,689,547 A * | 11/1997 | Molne | 379/379 |
| 5,689,700 A | 11/1997 | Miller et al. | 395/610 |
| 5,692,040 A | 11/1997 | Greenblatt | 379/350 |
| 5,734,706 A | 3/1998 | Windsor et al. | 379/142 |
| 5,749,052 A | 5/1998 | Hidem et al. | 455/406 |
| 5,768,362 A | 6/1998 | Moon | 379/356 |
| 5,794,230 A | 8/1998 | Horadan et al. | 707/2 |
| 5,796,832 A | 8/1998 | Kawan | 705/65 |
| 5,799,066 A | 8/1998 | Joyce et al. | 379/88 |
| 5,802,066 A | 9/1998 | Miyake et al. | 370/527 |
| 5,802,510 A | 9/1998 | Jones | 707/2 |
| 5,815,808 A | 9/1998 | Valentine | 455/422 |
| 5,841,854 A * | 11/1998 | Schumacher et al. | 379/265.11 |
| 5,862,325 A | 1/1999 | Reed et al. | 395/200.3 |
| 5,862,490 A | 1/1999 | Sasuta et al. | 707/200 |
| 5,864,622 A | 1/1999 | Marcus | 380/23 |
| 5,864,840 A | 1/1999 | Levng et al. | 707/2 |
| 5,878,406 A | 3/1999 | Noyes | 706/55 |
| 5,893,107 A | 4/1999 | Chan et al. | 707/103 |
| 5,901,214 A | 5/1999 | Shaffer et al. | 379/220 |
| 5,901,352 A | 5/1999 | St. Pierre | 455/426 |
| 5,909,650 A | 6/1999 | Jonsson | 455/461 |
| 5,918,224 A | 6/1999 | Bredenberg | 707/2 |
| 5,922,074 A | 7/1999 | Richard et al. | 713/200 |
| 5,926,754 A | 7/1999 | Cirelli et al. | 455/414 |
| 5,926,810 A | 7/1999 | Noble et al. | 707/4 |
| 5,956,718 A | 9/1999 | Prasad et al. | 707/10 |
| 5,958,016 A * | 9/1999 | Chang et al. | 709/229 |
| 5,974,130 A | 10/1999 | Sadri et al. | 379/210 |
| 5,983,095 A | 11/1999 | Cameron | 455/414 |
| 5,999,973 A | 12/1999 | Glitho et al. | 709/223 |
| 6,011,976 A | 1/2000 | Michaels et al. | 455/466 |
| 6,014,797 A | 1/2000 | Kuster et al. | 28/146 |
| 6,014,802 A | 1/2000 | Guerin | 29/407.01 |
| 6,035,190 A * | 3/2000 | Cox et al. | 455/417 |
| 6,044,142 A | 3/2000 | Hammarström et al. | 379/223 |
| 6,044,205 A | 3/2000 | Reed et al. | 395/200.31 |
| 6,047,184 A | 4/2000 | Haces et al. | 455/445 |
| 6,049,712 A | 4/2000 | Wallinder | 455/414 |
| 6,049,799 A | 4/2000 | Mangat et al. | 707/10 |
| 6,052,372 A | 4/2000 | Gittins et al. | 370/396 |
| 6,052,579 A | 4/2000 | McC Estabrook | 455/418 |
| 6,058,179 A | 5/2000 | Shaffer et al. | 379/220 |
| 6,065,016 A * | 5/2000 | Stuntebeck et al. | 707/200 |
| 6,069,946 A | 5/2000 | Lieuwen | 379/220 |
| 6,072,867 A | 6/2000 | Lieuwen | 379/220 |
| 6,081,705 A | 6/2000 | Houde et al. | 455/411 |
| 6,081,898 A | 6/2000 | Miller et al. | 713/201 |
| 6,088,125 A | 7/2000 | Okada et al. | 358/405 |
| 6,088,717 A | 7/2000 | Reed et al. | 709/201 |
| 6,094,479 A | 7/2000 | Lindeberg et al. | 379/220 |
| 6,097,950 A | 8/2000 | Bertacchi | 455/432 |
| 6,101,541 A | 8/2000 | Ellesson et al. | 455/414 |
| 6,104,797 A | 8/2000 | Nabkel et al. | 379/201 |
| 6,104,802 A | 8/2000 | Perlmutter | 379/220 |
| 6,108,537 A | 8/2000 | Comer et al. | 455/426 |
| 6,122,359 A | 9/2000 | Otto et al. | 379/210 |
| 6,122,364 A | 9/2000 | Petrunka et al. | 379/265 |
| 6,128,503 A | 10/2000 | Granberg | 455/461 |
| 6,134,446 A | 10/2000 | Sasuta et al. | 455/456 |
| 6,138,008 A | 10/2000 | Dunn et al. | 455/414 |
| 6,144,671 A | 11/2000 | Perinpanathan et al. | 370/409 |
| 6,144,959 A | 11/2000 | Anderson et al. | 707/9 |
| 6,185,290 B1 | 2/2001 | Shaffer et al. | 379/220 |
| 6,269,337 B1 * | 7/2001 | Desmond et al. | 704/270.1 |
| 6,366,913 B1 * | 4/2002 | Fitler et al. | 707/9 |
| 6,396,920 B1 * | 5/2002 | Cox et al. | 379/266.02 |
| 6,535,726 B1 | 3/2003 | Johnson | 455/406 |
| 6,546,002 B1 * | 4/2003 | Kim | 370/351 |
| 2001/0014598 A1 | 8/2001 | Cox et al. | 455/406 |
| 2001/0038624 A1 | 11/2001 | Greenberg et al. | 370/352 |
| 2002/0029178 A1 * | 3/2002 | Wiederin et al. | 705/34 |
| 2002/0055351 A1 | 5/2002 | Elsey et al. | 455/414 |
| 2002/0118811 A1 | 8/2002 | Davis et al. | 379/218.01 |
| 2003/0007625 A1 * | 1/2003 | Pines et al. | 379/223 |
| 2003/0032412 A1 | 2/2003 | Cox et al. | 455/414 |

* cited by examiner

SYSTEM AND METHOD FOR CONTEXT ASSOCIATION

RELATED APPLICATIONS

This application claims the benefit of copending U.S. Provisional Application No. 60/218,469, filed Jul. 14, 2000.

FIELD OF THE INVENTION

The present invention relates generally to an information system, and more particularly to a system and method for providing access to an entity by context association.

BACKGROUND OF THE INVENTION

Individuals and institutions are in constant need of information and access to each other and to services worldwide. This critical need for information and access is seemingly limitless and ever present as a consequence of technological advances in communication and connectivity. Nowhere in our society is this need more strongly felt and observed than by Internet and wireless telephony users everywhere.

For these reasons, directory assistance is one of the fastest growing segments of the traditional wireline telephone industry. Revenues have exceeded three billion dollars with an estimated call volume in excess of 8 billion inquiries per year. However, the traditional wireline industry is rapidly coming under competitive pressure for use and convenience form the wireless industry.

The cost of service for wireless communication is dramatically decreasing while the features provided are increasing. Wireless communication can provide nearly the same benefits as wireline at roughly the same cost. In addition, wireless communication can offer benefits that wireline cannot. These include 24-hour access in any location, insignificant or non-existent long distance and roaming fees, and in some cases number portability.

The problem with wireless communication that is addressed by the present invention is that there is currently no method for cellular subscribers to access the number of another cellular subscriber. This is a significant problem, since wireless service providers have seen the number of domestic subscribers increase to the current 72 million, all without a listing in a directory assistance. Wireless subscribers include traveling professionals, small independent business people, parents, children and "nomadic" students, each with specific needs for connectivity and information, but all of which are entirely inaccessible to the general population unless an information source is developed.

Another problem with telephone directories is obtaining the desired number of the person or company you wanted with limited information. In 1997 AT&T introduced OOInfo. This service was exclusive to AT&T customers only as an alternative to existing directory services such as "411" and "555–1212" and provided access to local and national numbers as well as address and zip code information. As an additional service, AT&T customers could search for a listing by just the spelling of the listing. In 1998 Sprint began to offer their customers national listings in over three thousand communities, and MCI introduced 10-10-9000 for both MCI and non-MCI customers.

Although these systems provide telephone number and some additional limited information, none provide directory access to wireless telephone subscribers and cannot provide subscriber selected information back to a caller or direct communication to the subscriber selected locations such as a home telephone, cell phone, email address or facsimile device.

SUMMARY OF THE INVENTION

The present invention solves the problem of providing access to an entity or services and may be applied to any system. The description of the invention for use in cellular directory assistance is for convenience and illustration of the features of the invention. It is to be understood that the invention has many embodiments and can be applied whenever access to an entity or services are needed.

In one embodiment, the invention solves the problem of cellular directory assistance and the need for subscriber directed telecommunication by providing wireline and wireless listing inquiries by means of a context association cellular directory assistance system for a nominal fee.

In one aspect of the invention, a cellular phone subscriber's web-managed context association such as, but not limited to, an alpha numeric string, is used as a unique address to locate and provide information, access, or both to a calling subscriber. To place a call or provide access to the subscriber, the invention associates a subscriber with a cellular phone number by context association. The subscriber manages context associations on the web, with conventions that are established by each subscriber. The invention provides for selectable levels of security allowing the subscriber to determine access and identification at all times. In addition, companies or institutions can group subscribers into communities for internal or external access as required.

Each community can provide its own context associations for its subscribers, allowing them to be easily identified by pre-existing, or specifically created conventions. Other members of that community can therefore easily find a subscriber, which make up the subscriber's calling universe or circle. Accordingly, the present invention goes beyond one-to-one relationships between a phone number and a user by providing contextual associations and relationships between a subscriber and its community.

BRIEF DESCRIPTION OF THE DRAWINGS

For the purpose of illustrating the invention, there is shown in the drawings a form, which is presently, preferred; it being understood, however, that this invention is not limited to the precise arrangements and instrumentalities shown.

DETAILED DESCRIPTION OF THE INVENTION

Referring now to the drawings, wherein there is shown in FIGS. 1 through 4 an illustration of the present invention embodied in a cellular director assistance system according to one aspect of the present invention.

Figure 1:
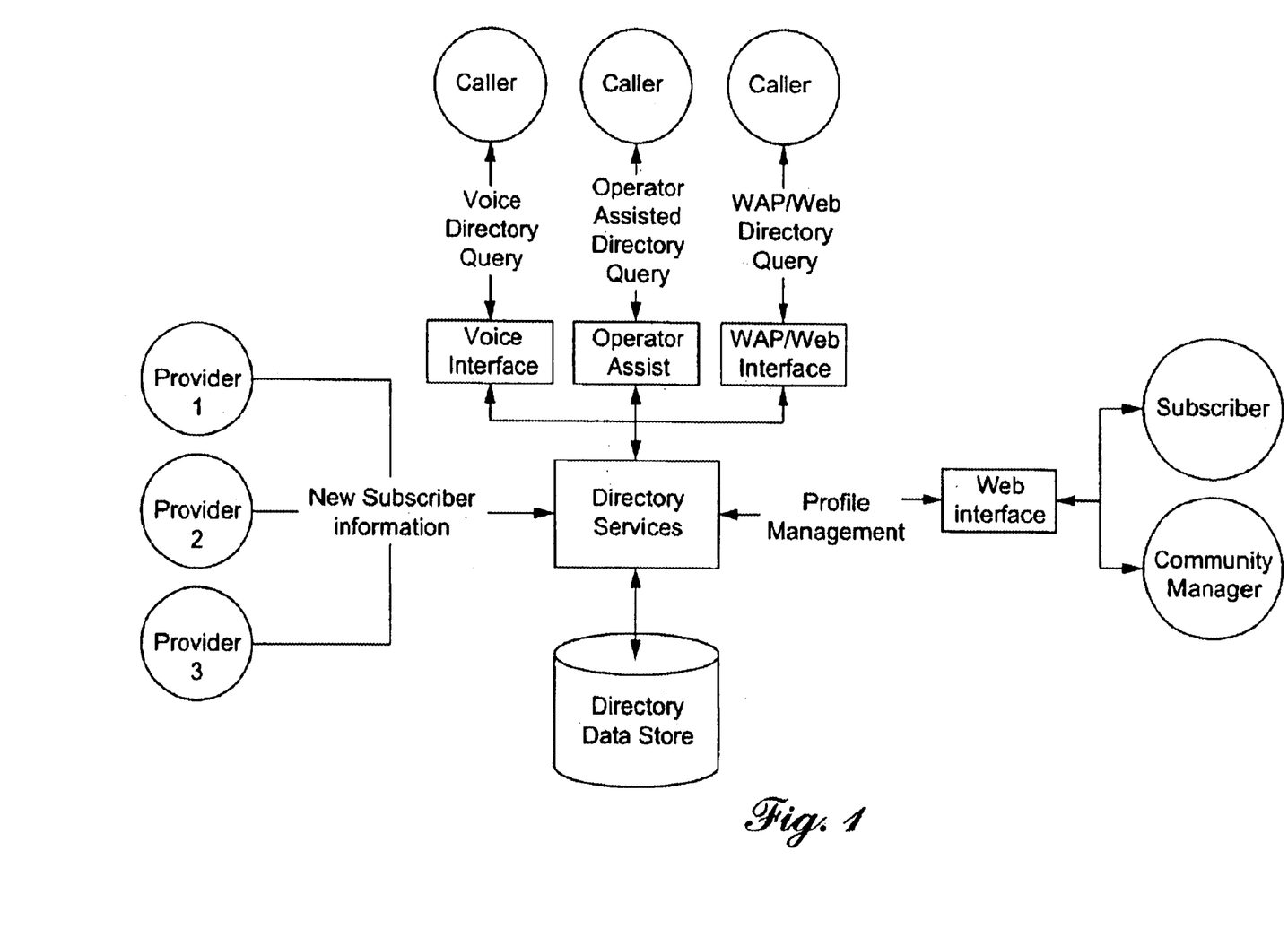
FIG. 1 illustrates a cellular director assistance system according to one embodiment of the present invention.
Figure 2:
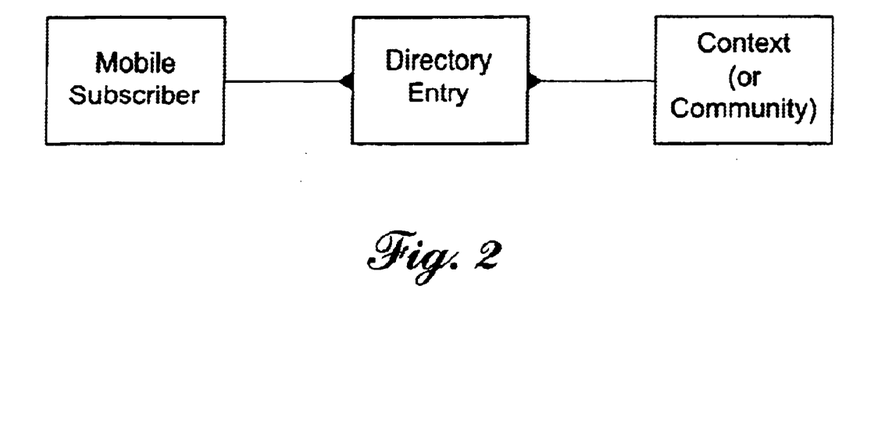
FIG. 2 illustrates a high-level data model according to one embodiment of the present invention.
Figure 3:
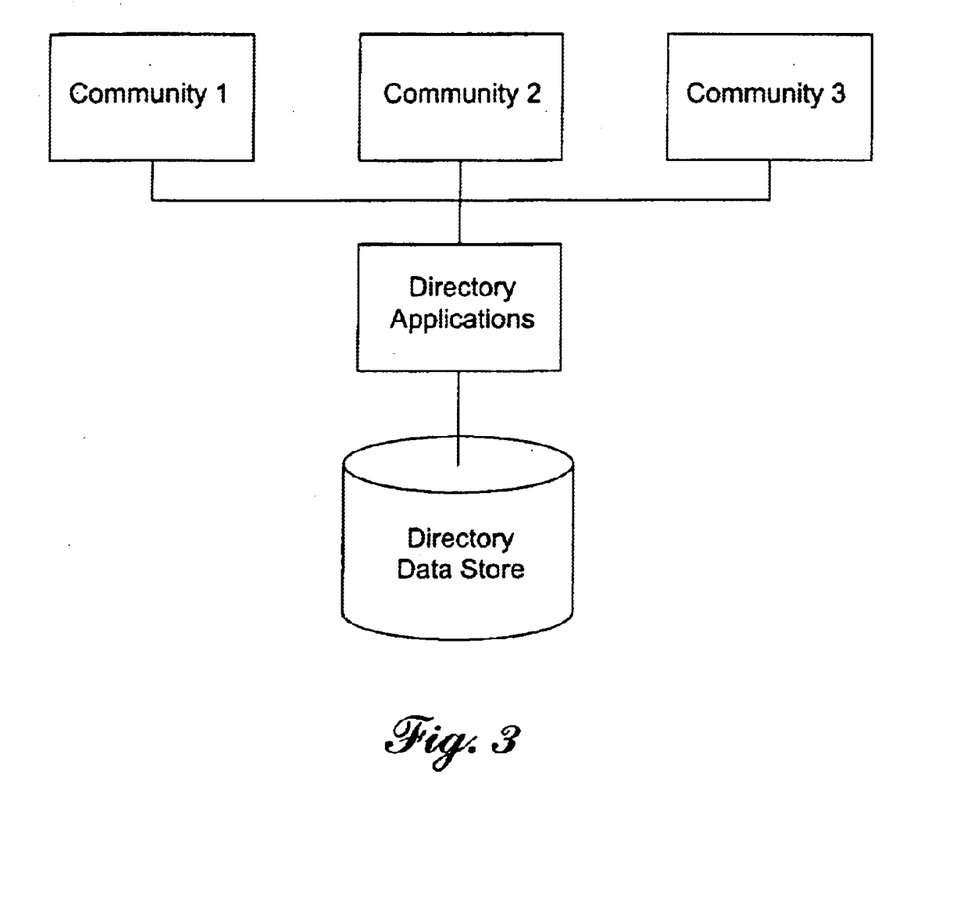
FIG. 3 illustrates a model for context data to be stored and analyzed according to one embodiment of the present invention.

In FIG. 2 a high-level data models is used to illustrate the context relationship between a subscriber and its community. A context includes, but is not limited to, a domain of predetermined conventions that are associated with predetermined individuals or predetermined services and used to locate subscribers by means of users having discrete knowledge about characteristics or conventions relevant to the individual or service desired. A subscriber can be an individual, company, bank account or service that is targeted or desired by the subscriber or user of the method or system.

Figure 4:
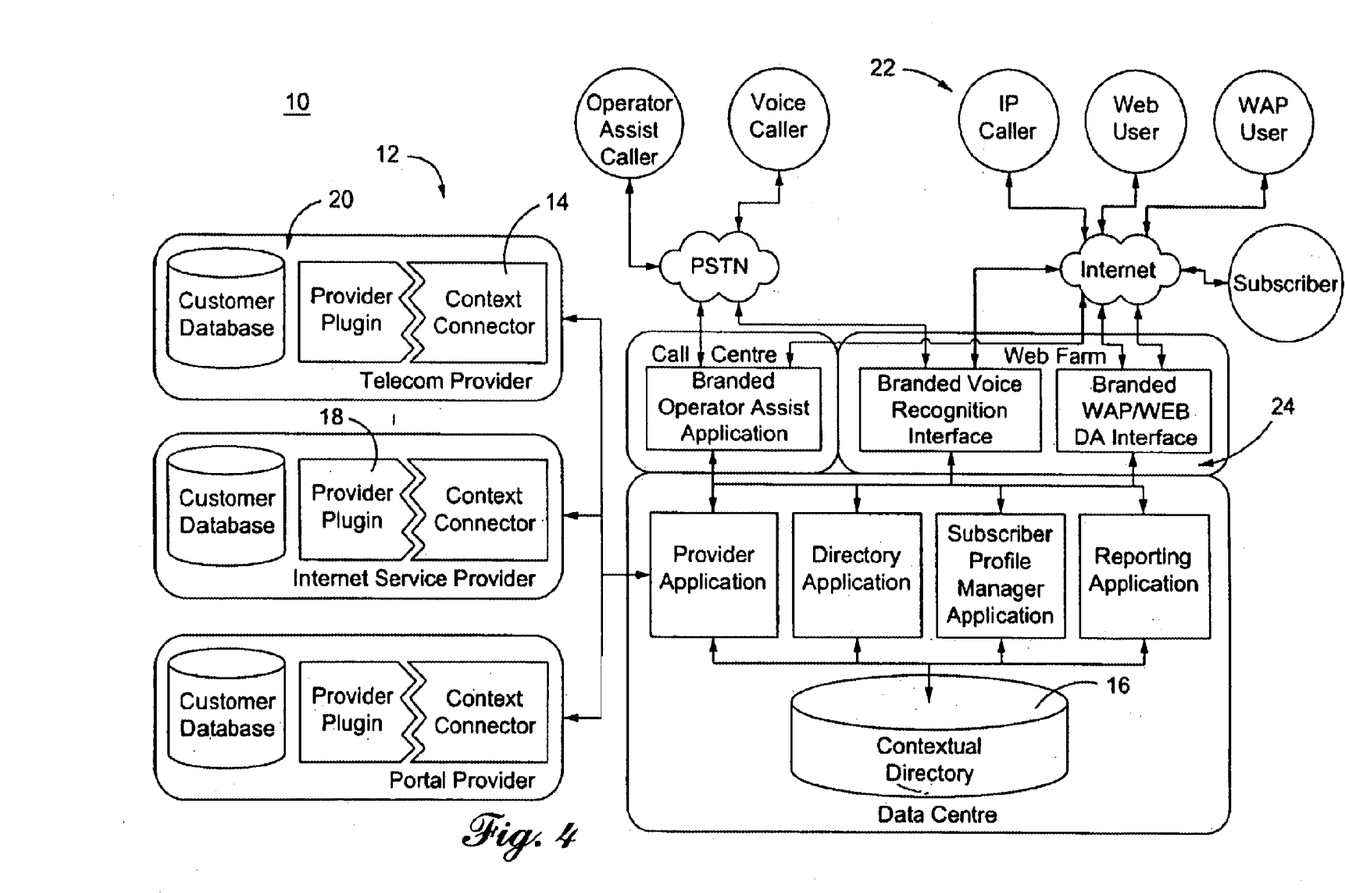
FIG. 4 illustrates another model for context data to be stored and analyzed according to one embodiment of the present invention.

In FIG. 4 a high level architecture 10 of the invention is shown applied to a directory assistance system. The left side 12 of the diagram represents the relationship with a partner provider. A component called the 'Context Connector' 14 is installed at each partner provider. This component provides the interface to a consolidated directory 16. The Provider Plugin 18 is a custom application that is developed with the assistance of the partner provider to interact with their subscriber data stores. The Context Connector 14 can be configured to hide the actual contact number, and creates a private and secure link between a key and the subscriber account. This key is then made available to the consolidated directory 16.

The Context Connector 14 is also used to receive a resolved Directory Lookup 20 into the partner provider's network where the key is resolved and the call or service is placed.

The top part of the diagram illustrates the various interfaces 22 available to the users of the service. There are multiple interfaces (Voice Call, Web, WAP) available to the service. Both the Telephone Network and Internet can be used. The center of the diagram illustrates the components 24 that would make up a Directory Assistance application. These include an application that manages the interfaces to the partner providers and provides the Directory Lookup. The application allows the data in the directory to be managed by authorized users, context administrators, and users. There will also be various reporting and billing applications. An important feature of the directory application is that the Contextual Directory can store the information for Subscribers and their Contexts. The invention includes a method for providing information to a subscriber having the steps of associating a subscriber with at least one predetermined context. Association with at least one context then accomplishes location of the subscriber. Access to the subscriber is provided when at least one context is located.

In one aspect of the invention, at least one context includes at least one subscriber fact such as, but not limited to, a phone number, address, nickname, identification number or job title. The context also includes a context key that broadly defines a subscriber or group of subscribers such as a company or department name or geographical location that is used to locate at least one subscriber. The context key includes a domain of predetermined conventions such as a type of business or service or any desirable characteristic that may be desired to associate a subscriber, or individuals, or services, or some combination thereof.

Security is another feature of the invention that is provided by a context key that is used as a private protection key for use by users having discrete knowledge about a predetermined individual or predetermined service. The context key is a private protection key that is freely selectable for use by an organization for providing or denying access to the members of the organization.

Revenue and statistic generation is also a feature of the invention and is accomplished in a number of ways. For example, a charge to a user or subscriber may be charged or collected when access or information is provided or requested or when at least one context is located. Billing can be acquired through the callers' service provider. The billing agent would then forward the fee to the present invention and the present invention would, in return, provide payments to the cellular service provider for the extraction or the billing collecting agent.

Access to a subscriber may be provided by acquiring a list of predetermined subscribers, associating at least one predetermined context for each predetermined subscriber on the list, locating at least one context, and then providing access to one or more predetermined subscribers on the list when at least one context is located.

In another aspect of the invention, access to a subscriber can be provided by establishing a list of predetermined contexts, establishing a list having at least one predetermined subscriber, associating at least one predetermined context for each predetermined subscriber, locating the at least one context, and providing access to one or more predetermined subscribers when at least one context is located.

Associating a predetermined subscriber with at least one predetermined context can be used to provide access to a subscriber. This may be accomplished by locating at least one context, and providing access to the predetermined subscriber when at least one context is located. The context includes at least one predetermined subscriber fact. Association with a subscriber is accomplished when the context is a domain of conventions that are associated with individuals or services for locating predetermined subscribers by users having discrete knowledge about the individual or service desired.

An enhanced directory allows users to selectively list themselves in one or more contexts. For example, a person might be known as "John Smith at Your Corporation", "John at Your Soft Ball Team", or even "Dad at My Family".

One feature of the system will allow the caller seeking a connection to contact the directory service and establish the context of the required listing. Then a search is initiated within the context.

There are a number of benefits to the proposed system.
1. People can be found by their "context". It is easy for people "within the context" to contact their members. For example a Softball coach can quickly get a hold of their team.
2. The system can restrict knowledge of the subscribers actual phone number. The subscriber can be contacted without revealing their number. The system allows the subscriber to remove themselves from a community and therefore remove unwanted calls without changing the subscribers phone number.
3. Implementing these "Contexts" makes the directory a suitable platform to leverage advanced network features like call groups and conferencing, as well as offering new tariff models.
4. The Directory becomes a highly valuable information source of people grouped by their interests
5. Providing applications for communities to manage their members creates an opportunity for cellular operators to provide a value-added service that will drive new connections or convert competitor connections to their service, virally, by empowering the community administrator.

Management of individual profiles (a person can belong to multiple contexts) can be made available over the Internet. There is almost no cost on the operator to maintain these profiles. In addition "Community Administrators" can mange their own communities. For example to club secretary of the Softball club may be the only person authorized to add members to the Context.

The population of the directory then becomes viral, which means that directory administrators will be allowed to enter their own communities. This provides unlimited expansion and additional value and incentive for target communities to increase connections. This viral model will also make it easier to sign up cellular providers.

The database can provide the platform for a number of related applications. With all this attributed data stored in a single logical store the store becomes very valuable.

Cellular directory assistance providers send new subscriber information to the system. All interfaces utilize XML messaging or other computer languages so subscriber transactions can be automated between the invention and cellular providers. In addition, the system can be used to develop data mapping for each major provider.

Community Managers can also add members to their community, and update member details. An individual subscriber can maintain a subset of their information as well. This feature includes the ability to remove them selves from a community, effectively "de-listing" themselves. This feature enables a value proposition for subscribers to reveal more of their profile making their directory information more valuable.

Callers seeking directory assistance can come in through a number of channels. They can dial a provider branded or independent directory information number and receive operator assistance. Or a subscriber can dial a number and use tones to navigate to the information they require. As technology improves we will use voice navigation.

Callers can also look up a web site for numbers from subscribers who have agreed to have their numbers listed in the particular context. This web directory will also be a small web application that can be "framed" into the related community web site if this exists. Other interfaces like WAP (Wireless Access Protocol), or other HTML browser (like Web TV, Palm PCs and PlayStation 2) can easily be supported by our architecture.

The invention opens the directory database to the Internet and wireless devices, and allows subscribers to manage the amount of directory data they want to expose to the world, by context.

Another feature of the invention is direct connect cellular directory assistance would provide either wireline or wireless access to any cellular phone subscriber. An inquiry would originate from either source, be received into the present invention's call center, and ultimately be directly connected to the requested party.

Direct connect cellular directory assistance can be accomplished by an operator of the present invention obtaining the pertinent information to be used for an electronic request from the appropriate cellular provider. Pertinent information would include such things as name, city and state and the cellular provider if available. Since the fee schedule would be based on extraction rather than inquiry, the applied software can determine providers in the geographic region and send an electronic request to each of them searching for a hit.

When a desired subscriber, service or listing is found, the operator would directly connect the user or inquirer to the listing and the calling subscriber is charged for the connection and the call. This transaction is carried out without revealing the target subscriber's phone number or Internet Protocol ("IP") address used by a computer attached to a TCP/IP network or fax number. This system thereby allows multiple providers to link their subscribers without revealing target subscriber specific information. This maintains the security of the target subscriber's data so that the cellular providers maintain the value of their database. As digital platforms become the standard and Personal Communications Services ("PCS") evolve, the inquirer should at least reach a subscriber's voice mail. From that point a message could be left or if connection is established, the number can be given directly by the subscriber.

A system for providing access to a plurality of subscribers is also provided by means of a directory and director. The directory includes addresses that are contextually associated with a predetermined subscriber or service. Each address provides access or information to one or more subscribers. The director provides access or information to one or more of the plurality of subscribers by associating one or more of the plurality of subscribers with at least one predetermined context.

The director provides statistics regarding the subscriber or service accessed, and can accept information from the associated subscriber that determines whether another subscriber can have access or proved information. The director can accept information that is associated with a subscriber that determines whether another subscriber can have information about the associated subscriber. The director can determine whether another subscriber can have access or information and can prevent association with one or more subscribers.

A privacy key that is either provided or created for the association controls association with one or more participants. The directory associates a privacy key to at least one or more subscribers and can establish or collect a predetermined charge when access is provided or when at least one context is located. In another aspect of the invention, a system for providing access to a subscriber includes an associator, a locator and a provider. The associator associates a predetermined subscriber with at least one predetermined context. The locator is used for locating the at least one context, and the provider provides access to the predetermined subscriber when at least one context is located.

Another feature of the invention is single number internet access. This feature provides a fee per inquiry or fee per extraction Internet based cellular phone number directory. Data would be provided from cellular providers through the same contractual arrangement as direct connect. Requested numbers would be transmitted and billed through e-mail via the Internet Service Provide ("ISP") rather than through cellular or wireline billing.

Internet access would be similar to direct connect in that there would be a need for a database control facility. The facility would not require the amount of space or staff that the direct connect center would require due to the state of technology and the definition of real time.

Under this scenario, real time could be as long as 5 to 7 minutes. This would allow the operator to handle a higher volume of calls. Also, the technology is available to "forward an inquiry" rather than having to re-type the information. It is envisioned that at some point in the future the operator would act only as a gatekeeper with the whole system being automated.

The process would be a currently recognized process. Inquiries would originate from a web page. The web page would explain to the customer that there is a fee for this service and that the inquirer will be billed via their ISP. The inquiry would be obtained through a point and click information box and transmitted directly to our center.

Once the inquiry is received, it will be forwarded to the appropriate cellular service providers for a search to be made. If a match is found it will be transferred either to our center or directly to the inquiry via return e-mail. It would be at that point that the billing would take place. Even if no match were found, a return message would indicate that no listing was found and the billing would occur.

Another feature of the invention is for use with a company maintained database. This feature provides the creation, maintenance, and cleaning of a corporate database. The present invention would contract with the cellular providers to develop a database consisting of all current and future subscribers. This would be the database that would be accessed when an inquiry came in.

The database would be developed and maintained through semi-skilled labor inputting new listings and deleting dead listings on a daily basis. Changes in the service provider's customer listing would be transmitted to the present invention's facility on a daily (possibly hourly) basis.

Under this scenario, an inquiry would arrive, and operators would perform a search in our database and provide the direct connect if a match is found. Billing would be provided through the initiator service provider (wireline or wireless).

Analysis of requests would provide the information to tune the invention and provide additional services like 'last 10 numbers' or 'my favorite numbers'. Cellular providers would be compensated through a licensing fee or a fee plus a percentage of direct connects for listings of their subscribers only.

Another feature of the invention is a direct connect platform by geographic region or area code. This feature consists of system operation by one entity for specific geographic region or area code grouping. An active national and international network of the invention would be achieved by the cooperation of local franchisees.

Each subscriber organization would need to contract with local or regional service providers for access to their database. Franchisees in other areas could access each other's network using the same process as any inquiry. Although the directory is currently based on cellular numbers, it can include any form of communication including, but not limited to, email, facsimile devices, Personal Digital Assistant ("PDA"), pagers and other electronic devices.

Another feature of the invention is utilizing a Domain Name System ("DNS") model for cellular directory assistance by creating relational pathways to identify a person without using or knowing their number. Another feature of the invention is to provide a person with multiple directory entries based on their context. Another feature of the invention is a viral information capability that provides for subscriber selectable and definable information protocols that enable communities to define themselves and sign members into the directory service. Another feature of the invention is to provide a base platform for other value added directory applications such as email directory, follow me, smart diverts, interest matching. Another feature of the invention is that it will find the digital address of any cellular phone, pagers, PDA's, or other communication device.

In an alternative embodiment, a user queries a Web site. By entering the context information, which may be done in a free-form or unstructured database interface, the user is given one or more potential connections. For example, a user might enter the string "Bob sailing California". If the context provides more than one possible match, the system can respond with additional context-based information relating to each possible match, such as employer, residence city, or other affiliations or contexts. In addition, the system, the user or the subscriber can screen or block positive absolute identifiers, such as telephone numbers, email addresses, physical addresses or the like.

Once the user has identified a desired subscriber, the user then indicates that he wishes to be connected to such subscriber. This may be done by a single click on an appropriate icon. If the subscriber has more than one mode of contact (e.g., landline, mobile phone, facsimile, email address, etc.), a menu will then allow the user to pick the desired mode of contact. For telephone-based contacts, including facsimile, the user may be supplied with a telephone number and a unique identifier code. The telephone number may be a "1–900" number or other similar number by which the user is charged for telephone connect time, and automatically billed to the database provider. The user dials the telephone number, and upon an automated system answering, enters the unique identifier number. The system then translates the unique identifier number to the appropriate telephone number of the subscriber, and connects the user to the subscriber.

The unique identifier number may be set so that it is valid only for a specified period of time, such as twelve hours, twenty-four hours, or so on. After the expiration period of the unique identifier number, the user must again employ the Internet-based access system, and obtain a new unique identifier number for the subscriber desired to be contacted. Alternatively, the unique identifier number may be permanent, but the subscriber may have the option, at any time, of canceling or deleting the unique identifier number. If the subscriber deletes the unique identifier number, and also changes or deletes context-based information, the subscriber cannot thereafter be reached by a user employing the same context-based information.

For e-mail connections, there can be a charge to the IP. Alternatively, a credit-card based account system may be established, whereby a user is charged a fee for each email transmitted. The email may be transmitted to a specified address including the unique identifier number, and then appropriately routed to the intended subscriber.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A method for providing information or access to a subscriber comprising the steps:

associating a subscriber or data with at least one predetermined context;

locating the at least one context; and providing information or access to the subscriber or data when the at least one context is located, wherein a service provider of the subscriber or data provides the information or access to the subscriber or data.

2. The method according to claim 1, wherein the at least one context includes at least one subscriber fact.

3. The method according to claim 1, wherein the at least one context includes a context key that is used to locate the at least one subscriber.

4. The method according to claim 3, wherein the context key includes a domain of predetermined conventions that is used to associate the subscriber with at least one entity, service or other individual, or a combination thereof.

5. The method according to claim 3, wherein the context key is a private protection key for use by users having discrete knowledge about a predetermined individual or predetermined service.

6. The method according to claim 3, wherein the context key is a private protection key for use by an organization for providing access to members of the organization.

7. The method according to claim 1, further comprising the step of incurring a predetermined charge when access is provided.

8. The method according to claim 1, further comprising the step of incurring a predetermined charge when at least one context is located.

9. The method according to claim 1, wherein the providing step maintains a predetermined aspect of the subscriber or the data.

10. The method according to claim 1, wherein the providing step includes transactions for wiring instructions or funds without revealing predetermined data relevant to the transaction.

11. A method for providing access to a subscriber comprising the steps:
    acquiring a list of predetermined subscribers;
    associating at least one predetermined context for each predetermined subscriber on the list;
    locating the at least one context; and
    providing access to one or more predetermined subscribers on the list when the at least one context is located, wherein the access to the one or more predetermined subscribers is provided without a contact number of the one or more predetermined subscribers being released from a service provider of the one or more predetermined subscribers.

12. A method for providing access to a subscriber comprising the steps:
    establishing a list having at least one predetermined context;
    establishing a list having at least one predetermined subscriber;
    associating at least one predetermined context for each predetermined subscriber;
    receiving a request for access to at least one predetermined subscriber, wherein the request includes at least one predetermined context associated with the at least one predetermined subscriber;
    locating the at least one context; and
    forwarding the request to a service provider of the at least one predetermined subscriber, wherein the service provider provides access to the at least one predetermined subscriber.

13. A method for providing access to a subscriber comprising the steps:
    associating a predetermined subscriber with at least one predetermined context;
    locating the at least one context using a first service provider or directory service; and
    providing access to the predetermined subscriber when the at least one context is located using a second service provider or directory service.

14. The method according to claim 13, wherein the at least one context includes at least one predetermined subscriber fact.

15. The method according to claim 13, wherein the step of associating is accomplished when the predetermined context is a domain of conventions that are associated with individuals or services for locating predetermined subscribers by users having discrete knowledge about the individual or service desired.

16. A system for providing access to a plurality of subscribers comprising:
    a directory of addresses that are contextually associated with a predetermined subscriber or service, each address providing access or information to one or more of the plurality of subscribers; and
    a director providing access or information to one or more of the plurality of subscribers by associating one or more of the plurality of subscribers with at least one predetermined context, wherein the access or information is provided while contact information of the one or more of the plurality of subscribers remains known only to a service provider of the one or more of the plurality of subscribers.

17. The system of claim 16, wherein the director provides statistics regarding the subscriber or service accessed.

18. The system of claim 16, wherein the director accepts information from the associated subscriber that determines whether another subscriber can have access or proved information.

19. The system of claim 16, wherein the director accepts information from the associated subscriber that determines whether another subscriber can have information about the associated subscriber.

20. The system of claim 16, wherein the director determines whether another subscriber can have access or information.

21. The system of claim 16, wherein the director prevents said association with one or more subscribers.

22. The system of claim 16, wherein the director prevents association with one or more participants unless a privacy key has been provided for the association.

23. The system of claim 16, wherein the directory associates a privacy key to at least one or more subscribers.

24. The system according to claim 16, wherein the provider establishes or collects a predetermined charge when access is provided.

25. The system according to claim 16, wherein the provider establishes or collects a predetermined charge when at least one context is located.

26. The system according to claim 16, wherein the system is an Application Service Provider for managing connectivity worldwide.

27. A system for providing access to a subscriber comprising:
    an associator for associating a predetermined subscriber with at least one predetermined context;
    a locator for locating the at least one context; and
    a provider for providing access to the predetermined subscriber when the at least one context is located, wherein the associator is a directory assistance provider or directory service and the provider is a service provider of the predetermined subscriber.

28. The system according to claim 27, wherein the at least one context includes at least one subscriber fact.

29. The system according to claim 27, wherein the at least one context includes a context key that is used to locate the at least one subscriber.

30. The system according to claim 29, wherein the context key includes a domain of predetermined conventions that are used to associate the at least one subscriber, or predetermined individuals, or predetermined services, or a combination thereof.

31. The system according to claim 29, wherein the context key is a private protection key for use by users having discrete knowledge about a predetermined individual or predetermined service.

32. The system according to claim 27, wherein the provider establishes or collects a predetermined charge when access is provided.

33. The system according to claim 27, wherein the provider establishes or collects a predetermined charge when at least one context is located.

34. A directory assistance system providing communication connectivity to a subscriber, comprising:
   a service provider database having contact information for a subscriber associated with a key;
   a contextual directory, in communication with the service provider database, having at least one context associated with the key; wherein:
      upon receipt of a call requesting communication connectivity to a pre-determined subscriber, the request including at least one context associated with the pre-determined subscriber, the at least one context received is located, and the key associated with the at least one context in the directory is forwarded with the call to the pre-determined subscriber's service provider where resolution of the key with contact information for the pre-determined subscriber occurs and communication connectivity to the pre-determined subscriber is provided.

35. The system of claim 34, wherein communication connectivity is provided without revealing the contact information for the pre-determined subscriber outside of the subscriber's service provider.

36. The system of claim 34, wherein communication connectivity is provided without a need for the directory assistance system to have knowledge of or retain the contact information for the pre-determined subscriber.

37. The system of claim 34, wherein a caller requesting communication connectivity to a pre-determined subscriber is billed through the caller's service provider upon location of the at least one context in the directory.

38. The system of claim 37, wherein the pre-determined subscriber is not billed upon location of the at least one context in the directory.

39. The system of claim 34, wherein a caller requesting communication connectivity to a pre-determined subscriber is billed through the caller's service provider upon communication connection to the pre-determined subscriber.

40. The system of claim 39, wherein the at least one pre-determined subscriber is not billed upon communication connection to the at least one pre-determined subscriber.

41. The system of claim 39, wherein the pre-determined subscriber's service provider is compensated for involvement with the system upon communication connection to the pre-determined subscriber.

42. The system of claim 34, further comprising a service provider connector, the service provider connector providing an interface between the service provider database and the contextual directory, the connector resolving the key with the contact information for the pre-determined subscriber and providing the communication connectivity to the pre-determined subscriber.

43. The system of claim 34, wherein the key further identifies a communication connectivity platform selected from the group consisting of home telephone, office telephone, cell telephone, e-mail address, and facsimile device.

44. The system of claim 34, wherein the service provider database further includes financial account information of the subscriber.

45. The system of claim 44, wherein the communication connectivity includes a funds transaction, and the financial account information of the subscriber is not revealed outside of the subscriber's service provider.

46. A method for providing communication connectivity to a subscriber, comprising the steps of:
   receiving a call requesting communication connectivity to a pre-determined subscriber, the request including at least one context associated with the pre-determined subscriber;
   locating the at least one context in a contextual directory and associating the at least one context with a key;
   forwarding the key and the call to a service provider database and linking the key with contact information for the pre-determined subscriber;
   providing communication connectivity to the pre-determined subscriber.

47. The method of claim 46, wherein communication connectivity to the pre-determined subscriber is provided by the subscriber's service provider.

48. A method for providing information about or access to a subscriber or data, the method comprising the steps of:
   associating contact information for a subscriber or data with a key and providing the contact information linked to the key at a first location;
   associating the key with at least one context characterizing the subscriber or data and providing the key linked to the at least one context at a second location;
   receiving a request for communication connectivity to a pre-determined subscriber, the request including at least one pre-determined context associated with the pre-determined subscriber;
   locating the pre-determined context at the second location;
   linking the key with the contact information for the subscriber or data at the first location;
   providing information about or access to the subscriber or data.

49. The method of claim 48, wherein the information about or access to the subscriber or data is provided without revealing the contact information or billing information of the subscriber or data.

50. The method of claim 48, wherein, when the pre-determined context includes at least one predetermined routing key, the information about or access to the subscriber or data is not provided unless the pre-determined context located includes the at least one predetermined routing key.

51. The method of claim 50, wherein the subscriber can select whether or not to employ the at least one predetermined routing key, and can select an identity of the at least one predetermined routing key.

52. The method of claim 48, wherein a fee is charged to a caller's service provider upon the providing, to the caller, of information about or access to the subscriber or data.

53. The method of claim 48, wherein a fee is charged to the subscriber upon the providing of information about or access to the subscriber or data.

54. The method of claim 48, wherein information about or access to the subscriber or data is provided without revealing the contact information of the subscriber or data outside the subscriber's service provider.

55. The method of claim 48, wherein the first location is within a service provider of the subscriber or data.

56. The method of claim 48, wherein the second location is within a directory assistance system or directory service.

57. The method of claim 48, wherein locating the pre-determined context at the second location is performed by the service provider of the subscriber or data.

58. The method of claim 48, wherein providing information about or access to the subscriber or data is performed by the service provider of the subscriber or data.

59. The method of claim 48, wherein linking the key with the contact information of the subscriber or data is performed by the service provider of the subscriber or data.

60. The method of claim 48, further comprising, after locating the predetermined context at the second location, the step of providing context-based information to a requester for requestor selection of the context-based information associated with the pre-determined subscriber to thereby narrow a search to the pre-determined subscriber.

61. The method of claim 60, wherein providing context-based information to the requestor does not reveal the contact information of the pre-determined subscriber.

62. The method of claim 48, wherein associating contact information for a subscriber or data with a key occurs at the first location.

63. The method of claim 48, wherein associating the key with at least one context characterizing the subscriber or data occurs at the first location.

* * * * *

UNITED STATES PATENT AND TRADEMARK OFFICE
CERTIFICATE OF CORRECTION

| | |
|---|---|
| PATENT NO. | : 6,731,927 B1 |
| DATED | : May 4, 2004 |
| INVENTOR(S) | : Robert Allen Stern, Rod Drury and Sunny Ahn |

It is certified that error appears in the above-identified patent and that said Letters Patent is hereby corrected as shown below:

Title page, Item [54] and Column 1, lines 1-2,
Title, delete "SYSTEM AND METHOD FOR CONTEXT ASSOCIATION" and insert -- DIRECTORY ASSISTANCE AND CALL CONNECTIVITY VIA CONTEXT ASSOCIATION --;

Title page,
Item [56], References Cited, U.S. PATENT DOCUMENTS, insert the following missing references:
-- 5,452,350    09/1995    Reynolds et al.
   5,768,360    06/1998    Reynolds et al.
   5,805,830    09/1998    Reese et al. --;
FOREIGN PATENT DOCUMENTS, insert the following missing references:
-- EP    0504481 A1    12/1991
   EP    0728636 A1    02/1996
   EP    0538656 A2    09/1992
   DE    3347945 C2    05/1987
   DE    4201019 A1    07/1993
   DE    4427537 A1    02/1996
   DE    19502033 C1    06/1996
   UK    230,234    02/1924
   UK    942,892    09/1960
   UK    2300444    05/1996 --;
OTHER PUBLICATIONS, insert the following missing references:
      -- Visitalk.com; communication with vision, http://www.visitalk.com, 1999-2000.
      XNSORG, http://www.xns.org, 2001.
      ONENAME; Identity-Based Privacy and Permissions Management, http://www.onename.com, 2001. --;
Item [57], ABSTRACT, replace the Abstract with the following:

-- Directory assistance and call connectivity via context association is provided by associating subscriber contact information with a key at a provider database. At a directory service database, the keys are associated with and bound to unique properties (contexts) characterizing the subscribers, the database facilitating a searching of the contexts. A call is placed or a lookup is conducted by a caller, to an operator, online directory, or a network directory, the call requesting access to a subscriber and including at least one context associated with the subscriber. The context is located in the directory service database and the associated key identified. The key, identifying a subscriber provider, is routed with the call to the respective provider where the key is located, the subscriber's contact information identified, and access to the subscriber provided. Use of the key allows subscriber connectivity without revealing, to the caller, the subscriber's contact information. --;

UNITED STATES PATENT AND TRADEMARK OFFICE
CERTIFICATE OF CORRECTION

PATENT NO. : 6,731,927 B1
DATED : May 4, 2004
INVENTOR(S) : Robert Allen Stern, Rod Drury and Sunny Ahn It is certified that error appears in the above-identified patent and that said Letters Patent is hereby corrected as shown below:

Column 1,
Line 27, delete "form" and insert -- from --;
Line 51, delete "00Info." and insert -- 00Info. --;

Column 4,
Line 56, delete "interests" and insert -- interests. --;

Column 8,
Lines 48-56, replace Claim 1 with the following:

-- 1. A method for providing a requestor communication connection to subscribers or data over a communication network, the method comprising the steps of:
    associating a subscriber or data with at least one predetermined context in a directory database;
    locating the at least one context in the directory database without requiring use of a contact address or directory number of the subscriber or data; and
    providing information or access to the subscriber or data when the at least one context is located, wherein a service provider of the subscriber or data determines the contact address or directory number of the subscriber or data and provides the communication connection to the subscriber or data without requiring release of the contact address or directory number of the subscriber or data to the requestor. --;

Column 9,
Lines 19-31, replace Claim 11 with the following:

-- 11. A method for providing a communication connection to a subscriber over a communication network, the method comprising the steps of:
    acquiring a list of predetermined subscribers;
    associating at least one predetermined context for each predetermined subscriber on the list;
    locating the at least one context; and
    providing a communication connection to one or more predetermined subscribers on the list when the at least one context is located, wherein the communication connection to the one or more predetermined subscribers is provided to a requestor without a contact address or directory number of the one or more predetermined subscribers being released in the associating and locating steps from a service provider of the one or more predetermined subscribers and without requiring release of the contact address or directory number of the one or more predetermined subscribers to the requestor. --;

UNITED STATES PATENT AND TRADEMARK OFFICE
CERTIFICATE OF CORRECTION

| | |
|---|---|
| PATENT NO. | : 6,731,927 B1 |
| DATED | : May 4, 2004 |
| INVENTOR(S) | : Robert Allen Stern, Rod Drury and Sunny Ahn |

It is certified that error appears in the above-identified patent and that said Letters Patent is hereby corrected as shown below:

Column 9 (cont'd),
Lines 32-48, replace Claim 12 with the following:

-- 12. A method for providing a communication connection to a subscriber over a communication network, the method comprising the steps of:
    establishing a list having at least one predetermined context;
    establishing a list having at least one predetermined subscriber;
    associating at least one predetermined context for each predetermined subscriber;
    receiving a request for communication connection to at least one predetermined subscriber from a requestor, wherein the request includes at least one predetermined context associated with the at least one predetermined subscriber;
    locating the at least one context in a directory database without requiring use of a contact address or directory number of the subscriber; and
    forwarding the request for communication connection to a service provider of the at least one predetermined subscriber, wherein the service provider determines the contact address or directory number of the at least one pre-determined subscriber; and
    providing the communication connection to the at least one predetermined subscriber without requiring release of the contact address or directory number of the subscriber to the requestor. --;

Lines 50-58, replace Claim 13 with the following:

-- 13. A method for providing a requestor communication connection to a subscriber over a communication network, the method comprising the steps of:
    associating a predetermined subscriber with at least one predetermined context;
    locating the at least one context using a first service provider or directory service, wherein the first service provider or directory service does not require access to a contact address or directory number of the predetermined subscriber; and
    providing a communication connection to the predetermined subscriber when the at least one context is located using a second service provider or directory service without requiring release of the contact address or directory number of the predetermined subscriber to the requestor.--;

UNITED STATES PATENT AND TRADEMARK OFFICE
CERTIFICATE OF CORRECTION

PATENT NO.     : 6,731,927 B1
DATED          : May 4, 2004
INVENTOR(S)    : Robert Allen Stern, Rod Drury and Sunny Ahn It is certified that error appears in the above-identified patent and that said Letters Patent is hereby corrected as shown below:

Column 10,
Lines 1-14, replace Claim 16 with the following:

-- 16. A system for providing a requestor communication connection to a plurality of subscribers over a communication network, comprising:
    a directory of addresses that are contextually associated with a predetermined subscriber or service, each address providing access or information to one or more of the plurality of subscribers; and
    a director providing communication connection to one or more of the plurality of subscribers without requiring release of a contact address or directory number of the one or more of the plurality of subscribers by associating one or more of the plurality of subscribers with at least one predetermined context without using the contact address or directory number of the one or more of the plurality of subscribers, wherein only a service provider of the one or more of the plurality of subscribers must use the contact address or directory number of the one or more of the plurality of subscribers to facilitate the communication connection. --;

Lines 44-53, replace Claim 27 with the following:

-- 27. A system for providing communication connection to a subscriber over a communication network, comprising:
    an associator for associating a predetermined subscriber with at least one predetermined context;
    a locator for locating the at least one context without using a contact address or directory number of the subscriber; and
    a provider for providing a requestor communication connection to the predetermined subscriber when the at least one context is located, without requiring release of the contact address or directory number of the subscriber to the requestor, wherein the associator is a directory assistance provider or directory database and the provider is a service provider of the predetermined subscriber. --;

UNITED STATES PATENT AND TRADEMARK OFFICE
CERTIFICATE OF CORRECTION

| | | |
|---|---|---|
| PATENT NO. | : 6,731,927 B1 | |
| DATED | : May 4, 2004 | |
| INVENTOR(S) | : Robert Allen Stern, Rod Drury and Sunny Ahn | |

It is certified that error appears in the above-identified patent and that said Letters Patent is hereby corrected as shown below:

Column 11,
Lines 7-24, replace Claim 34 with the following:

-- 34. A directory assistance system providing a communication connection to a subscriber over a communication network, comprising:
    a service provider database having contact information for a subscriber associated with a key;
    a contextual directory database, in communication with the service provider database, having at least one context associated with the key while not retaining a contact address or directory number of the subscriber; wherein:
    upon receipt of a request for communication connection from a requestor to a pre-determined subscriber, the request including at least one context associated with the pre-determined subscriber, the at least one context is located in the contextual directory database without using a contact address or directory number of the subscriber, and the key associated with the at least one context in the contextual directory database is forwarded with the request to the pre-determined subscriber's service provider where resolution of the key with the contact address or directory number for the pre-determined subscriber occurs facilitating the communication connection to the pre-determined subscriber without requiring release of the contact address or directory number of the subscriber to the requestor. --;

Column 12,
Lines 3-15, replace Claim 46 with the following:

-- 46. A method for providing a requestor communication connection over a communication network to a subscriber, the method comprising the steps of:
    receiving a communication connection request to a pre-determined subscriber, the request including at least one context associated with the pre-determined subscriber;
    locating the at least one context in a contextual directory database, where the at least one context is linked to a key, and where locating occurs without using the pre-determined subscriber's contact address or directory number;
    forwarding the key and the connection request to a service provider database and linking the key with the contact address or directory number of the pre-determined subscriber;
    providing communication connection to the pre-determined subscriber without requiring release of the contact address or directory number of the pre-determined subscriber to the requestor. --;

UNITED STATES PATENT AND TRADEMARK OFFICE
CERTIFICATE OF CORRECTION

PATENT NO.    : 6,731,927 B1
DATED         : May 4, 2004
INVENTOR(S)   : Robert Allen Stern, Rod Drury and Sunny Ahn It is certified that error appears in the above-identified patent and that said Letters Patent is hereby corrected as shown below:

<u>Column 12 (cont'd)</u>,
Lines 19-36, replace Claim 48 with the following:

-- 48. A method for providing communication connection over a communication network to a subscriber or data, the method comprising the steps of:
    associating a contact address or directory number for a subscriber or data with a key and providing the contact address or directory number linked to the key at a first location;
    associating the key with at least one context characterizing the subscriber or data and providing the key linked to the at least one context at a second location;
    receiving a request for communication connection from a requestor to a pre-determined subscriber or data, the request including at least one pre-determined context associated with the pre-determined subscriber or data;
    locating the pre-determined context received with the communication request at the second location, wherein the second location does not use the contact address or directory number of the subscriber or data in the locating step;
    linking the key with the contact address or directory number of the subscriber or data at the first location;
    providing communication connection to the subscriber or data without requiring release of the contact address or directory number of the subscriber or data to the requestor. --.

Signed and Sealed this

Eighteenth Day of January, 2005

JON W. DUDAS
*Director of the United States Patent and Trademark Office*